(12) United States Patent  
Roig

(10) Patent No.: US 7,509,495 B2
(45) Date of Patent: Mar. 24, 2009

(54) AUTHENTICATION PROTOCOL

(75) Inventor: Daniel Roig, Stockholm (SE)

(73) Assignee: Cinnober Financial Technology, AB, Stockholm (SE)

( * ) Notice: Subject to any disclaimer, the term of this patent is extended or adjusted under 35 U.S.C. 154(b) by 770 days.

(21) Appl. No.: 10/617,652

(22) Filed: Jul. 10, 2003

(65) Prior Publication Data

US 2005/0022020 A1    Jan. 27, 2005

(51) Int. Cl.
    *H04L 9/00*    (2006.01)
(52) U.S. Cl. ...................................... 713/168
(58) Field of Classification Search ................... 713/168
    See application file for complete search history.

(56) References Cited

U.S. PATENT DOCUMENTS

| | | | |
|---|---|---|---|
| 6,052,466 | A | 4/2000 | Wright |
| 7,133,526 | B2 | 11/2006 | Whelan et al. |
| 2004/0187024 | A1* | 9/2004 | Briscoe et al. ............... 713/201 |
| 2004/0249974 | A1* | 12/2004 | Alkhatib et al. ............. 709/245 |

OTHER PUBLICATIONS

Letters, "More Mithra", Architecture & Design, Dr. Dobb's Portal, Sep. 2003, www.ddi.com.
The Mithra Authentication Protocol—Thwarting Man-In The Middle Attacks, Security, Dr. Dobb's Portal, Mar. 27, 2003, www.ddi.com.
Letters, "Mithra", Architecture & Design, Dr. Dobb's Portal, Jul. 2003, www.ddi.com.

* cited by examiner

*Primary Examiner*—Jacob Lipman
(74) *Attorney, Agent, or Firm*—Jones Day

(57) ABSTRACT

The invention relates to an authentication protocol for increasing safety against a man-in-the-middle (MITM) access attack for point-to-point communication (10), between client computer (12) and server (14), to services. The server (14) responds with an N byte nonce value and the client computer (12) utilizes a hash algorithm to compute a hash value of the parameters clients' password, client computer unique IP address, server IP address, and the nonce value. The hash value is transmitted through the client computer (12) as an authenticator for accessing the services, whereby the server (14) reproduces the authenticator by utilizing the same hash algorithm and parameters. A compare between the reproduction and the transmitted authenticator is accomplished. If they match, the grant of an access to the server (14) and services is authorized. By utilizing the client computer (12) unique IP address in the authenticator it prevents a MITM computer (16), having a different IP address, from addressing the server with a matching authenticator. The present invention also comprises an authenticator signal and a medium for carrying the signal.

9 Claims, 3 Drawing Sheets

AUTHENTICATION PROTOCOL

TECHNICAL FIELD

The present invention pertains to an authentication protocol for increasing safety against a man-in-the-middle computer access attack to services in a network for data and telecommunication utilizing a challenge-response pattern. It also pertains to an authenticator signal, a medium for carrying the signal and a detector for detecting a man-in-the-middle attack.

BACKGROUND ART

A so called man-in-the-middle attack constitutes a big security risk regarding authentication utilizing networks for data and/or telecommunication. In a networked environment, the need to properly authenticate the communicating parties has become more and more crucial. Network spoofing has become a huge security risk, and must be mitigated.

A communications module, named Hermes to the applicant of the present invention, has the capability of enabling its clients to communicate covertly, through the use of encryption. Each new connection begins with a session key establishment. Currently, this is accomplished using the Diffie-Hellman key agreement protocol. A major drawback with this algorithm is that it does not authenticate the parties that are agreeing upon a common key. Thus, a malicious party may secretly establish an encryption key between two parties and none is the wiser. This is generally called a man-in-the-middle attack (MITM). In general, a MITM attack can defeat any protocol that does not involve some sort of shared secret between authenticating parties.

Authentication is the process of establishing the identity of an entity or more pragmatically, verifying that a user is who he or she claims to be. Authentication is one of the cornerstones of computer security. Only with proper authentication can reliable traceability be achieved in a system.

Traditionally, user credentials are represented as a user id and password pair. The user id is who you claim to be and the password is used to ascertain the veracity of that claim. Passwords are usually used as a shared secret between the authenticating entity and the entity wishing to prove his or hers knowledge of the shared secret. The password is sometimes referred to as the authenticator. Passwords are by far the most used form of authentication, believed to represent 95% of all authentication mechanisms out on the field.

Public-key cryptography offers the ability of associating a user with a cryptographic key pair, e.g. using the RSA algorithm. Assuming key sizes have been appropriately chosen, this authentication mechanism is very powerful as it is generally very hard to defeat. However, public-key cryptography is not a panacea. There are a number of issues associated with it, such as how to protect the private key and how to securely administrate all the keys.

SUMMARY OF THE INVENTION

An aim of the present invention is to increase the protection against a man-in-the-middle attack during initialized access from a client computer to a server. Hence, the present invention sets forth an authentication protocol for increasing safety against a man-in-the-middle computer access attack for point-to-point communication, between a client computer and a server, to services in at least one of a network for data and telecommunication utilizing a challenge-response pattern. The invention thus comprises:

transmitting through a client computer an authentication request containing a clients username to a server providing the services, the server identifying the client computer IP address and a client password accessible by the server through the transmitted username;

the server responding with an N byte nonce value;

the client computer utilizing a hash algorithm to compute a hash value of at least the parameters clients password, client computer unique IP address, server unique IP address, and the nonce value;

transmitting the hash value through the client computer as an authenticator for accessing the services; and the server reproducing the authenticator by utilizing the hash algorithm and the parameters clients accessible password, client computer unique IP address, server unique IP address, and the nonce value, comparing the reproduction with the transmitted authenticator, and granting an access to the server and services if the reproduced authenticator matches the transmitted, thus by utilizing the client computer unique IP address, and server unique IP address in the authenticator preventing a man-in-the-middle computer, having a different IP address, from addressing the server with a matching authenticator.

In one embodiment of the present invention, the N byte nonce is a random data only generated once by a random generator and used once in the point-to-point communication and then discarded.

Another embodiment comprises that the random generator is provided a seed to produce the nonce numerical value. The seed can be comprised of the password and a volatile value. The volatile value can for instance be a timestamp value or a counter value.

In a further embodiment, the parameters are concatenated in an arbitrary order before the hash algorithm is applied. The hash algorithm can be one of SHA-1, SHA-256, SHA-384 and SHA-512 or like. Moreover, the hash algorithm can be an HMAC utilizing the password as a key.

In another embodiment, a salt value is concatenated to the password before it is hashed.

The present invention also sets forth an authenticator signal utilized in a protocol for increasing safety against a man-in-the-middle computer access attack for point-to-point communication, between client computer and server, to services in at least one of a network for data and telecommunication. Hereby, the signal comprises:

the hash value of at least the parameters clients password, client computer unique IP address, server unique IP address, and an N byte nonce value constituting the authenticator signal for accessing the services; and the authenticator signal comprising the client computer unique IP address and the server unique address, thus preventing the authenticator signal from being sent from a computer with a different IP address.

Furthermore, the present invention claims a medium for carrying an authenticator signal utilized in a protocol for increasing safety against a man-in-the-middle computer access attack for point-to-point communication, between client computer and server, to services. Thus, the signal comprises the hash value of at least the parameters clients password, client computer unique IP address, server unique IP address, and an N byte nonce value constituting the authenticator signal for accessing the services. The authenticator signal comprising the client computer unique IP address and server unique IP address, thus preventing the authenticator signal from being sent or launched from a computer with a different IP address in the medium, the medium being a network for at least one of data and telecommunication.

The present invention also sets forth a detector in a server for increasing safety against a man-in-the-middle computer access attack for point-to-point communication, between a client computer and the server, to services in at least one of a network for data and telecommunication utilizing a challenge-response pattern. The detector comprises:

detection of a transmission, through what is believed to be a client computer, of an authentication request containing a clients username to a server providing the services, the server identifying the client computer IP address and a client password accessible by the server through the transmitted username;

the server responding with an N byte nonce numerical value;

the client computer utilizing a hash algorithm to compute a hash value of at least the parameters clients password, client computer unique IP address, server unique IP address, and the nonce value;

transmitting the hash value through the client computer as an authenticator for accessing the services; and the server reproducing the authenticator by utilizing the hash algorithm and the parameters clients accessible password, client computer unique IP address, server unique IP address, and the nonce value, comparing the reproduction with the transmitted authenticator, whereby the detector detects a difference between the reproduction and the transmitted authenticator determining a man-in-the-middle computer attack.

In one embodiment of the invention, the IP address of the man-in-the-middle computer is determined by reverse analyzing the transmitted authenticator by utilizing the reproduced correct authenticator.

It is appreciated that the embodiments relating to the above described authentication protocol also apply to the authenticator signal, the medium of the present invention, and the detector.

BRIEF DESCRIPTION OF THE DRAWINGS

Henceforth reference is had to the following description taken in conjunction with the accompanying drawings for a better understanding of the present invention with its given embodiments and examples, in which.

DETAILED DESCRIPTION OF PREFERRED EMBODIMENTS

The present invention provides an authentication protocol for increasing safety in point-to-point communication between a client and a server against a man-in-the-middle attack in a network for data and telecommunication utilizing a challenge-response pattern. The invention also provides an authenticator signal, a medium to carry the signal, and a detector for a man-in-the-middle attack.

Figure 1:
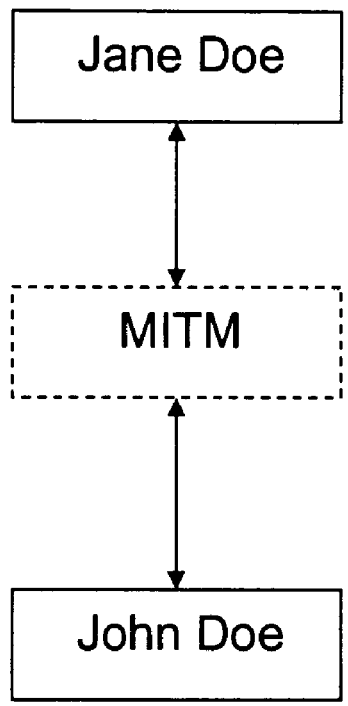
FIG. 1 very schematically illustrates a man-in-the-middle attack in a network for data and/or telecommunication.

In FIG. 1 it is very schematically depicted how a person named John Doe would like to establish a secret key access with a person named Jane Doe in accordance with an established scheme or protocol for that purpose (not described). The fictious malicious user, man-in the-middle, MITM, purporting to be Jane Doe, establishes a key with John Doe. Next, MITM establishes a secret key with Jane Doe, purporting to be John Doe. Hence, MITM now act as a secret go-between and neither Jane Doe nor John Doe is the wiser. MITM can now read anything that is encrypted by either Jane Doe or John Doe.

As has been addressed in the description of the background art for the present invention public-key cryptography is an option for authentication. When public-key cryptography is used as a means to authenticate an entity, so called certificates are widely employed. A certificate is simply a data structure containing a number of fields describing the owner of the certificate, such as:

The name of the certificate's owner.
The name of the certificate owner's organization.
Expiration date.
Issuing date.
The owner's public key.
The name of certificate's signer.
The certificate's signature.

Figure 2:
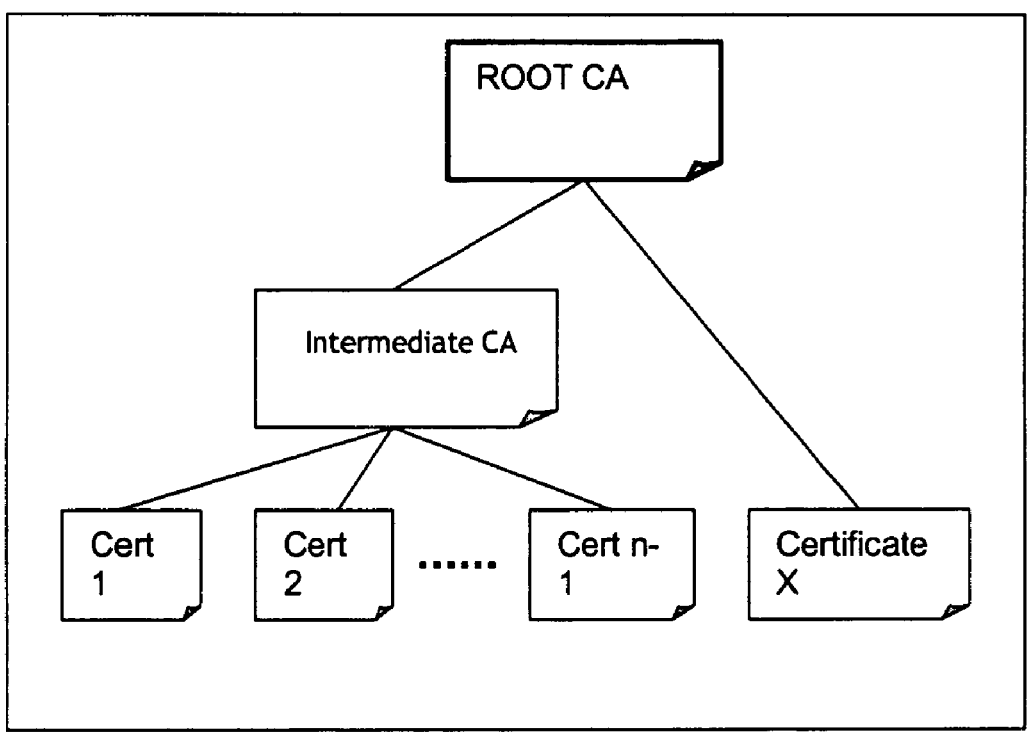
FIG. 2 is schematically illustrating a prior art public-key infrastructure.

The last three fields listed above are of particular interest. A valid certificate is always cryptographically signed by someone else, thereby testifying to the accuracy of the certificate. That someone should be someone trusted not to sign bogus certificates. FIG. 2 is schematically illustrating a prior art public-key infrastructure. Usually, a certificating authority or CA performs this task. By following the signature chain, eventually a CA certificate trusted is encountered, which is usually called the root CA. If not, then the certificate contested to be verified should be refused. This signature chain or hierarchy forms a certificate infrastructure; this is what is normally referred to as a public-key infrastructure or PKI.

In order for users with valid certificates to authenticate themselves, they may sign a piece of data given by the entity requesting the user to authenticate. The signed data and the certificate are sent back to the requestor, which can verify both the signature and the validity of the certificate. As long as the associated private key has not been compromised, this scheme will work.

In Secure Sockets Layer (SSL), a transport level technology for authentication and data encryption between a Web-server and a Web-browser, the name of the host running the Web-server is used as the owner of its certificate. This enables its clients to verify that they have a secure connection with the server they believe is on the other end.

It is now described how the present invention operates and how it can detect an ongoing man-in-the-middle, MITM, attack. The present invention protocol is designed specifically to detect this attack.

The main design goals of the present invention are:
To detect a MITM attack.
To avoid sending the password (or any other authenticator) in the clear over the network.
To prevent replay attacks.

Figure 3:
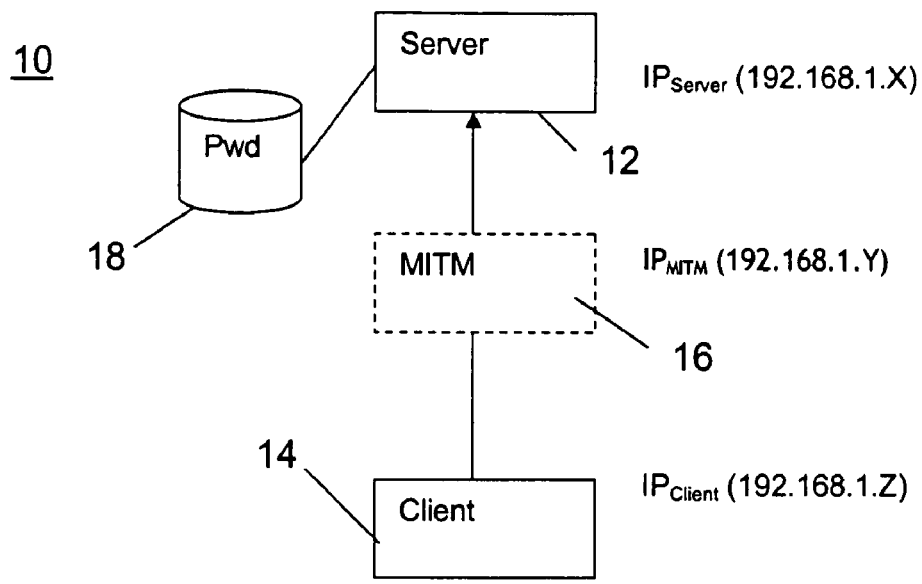
FIG. 3 is schematically illustrating a point-to-point data traffic connection between a client and a server.
Figure 4:
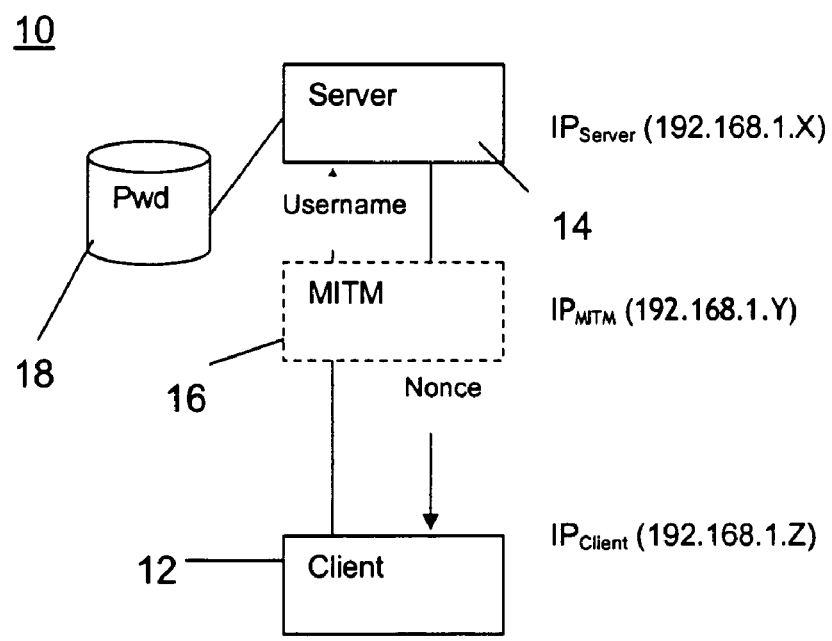
FIG. 4 is schematically illustrating an authentication request from a client and a response from a server in accordance with the present invention.

FIG. 3 is schematically illustrating a starting configuration for a point-to-point 10 data traffic connection between a client computer 12 (client) and a server 14. The present invention uses a challenge-response pattern. It operates so that a client 12 that would like to authenticate to the server 14, initiates a transaction claiming to be user X by sending its username. In a reply from the server 14, the client 12 receives an N byte nonce. This is schematically illustrated in FIG. 4, through an authentication request from a client 12 and a response from a server 14 in accordance with the present invention. A nonce is a random piece of data, generated once and only once. After using the nonce, it is discarded.

FIG. 3 to 6, for the purpose of illustration, describe the steps taken in the entire protocol in accordance with the present invention in preventing a malicious user, MITM 16, assumed to reside in the middle, intercepting the traffic between server 14 and client 12. As depicted in FIG. 3-6 it is evident that the client 12, MITM 16 and server 14, have different IP addresses (192.168.1 Z), (192.168.1.Y), and (192.168.1.X), respectively, where the difference is denoted Z, Y, and X, respectively.

When the client 12 has received the nonce value, the client 12 then generates a hash with the following inputs 1-4:

1. The hashed password of user X.
2. The client's IP address.
3. The server's IP address.
4. The nonce.

With reference to FIG. 4, the client 12 sends an authentication request containing the name of the user (username) that is to be authenticated. The addressed server 14 replies with an N byte nonce. HASH algorithms or functions are well known in the art. A HASH is a function, mathematical or otherwise, that takes a variable-length input string (named a pre-image) and converts it to a fixed-length (generally smaller) output string (named a HASH value).

The client computes the hash value of the following concatenated parameters:

The password (Pwd).
$IP_{Client}$
$IP_{Server}$
Nonce

Figure 5:
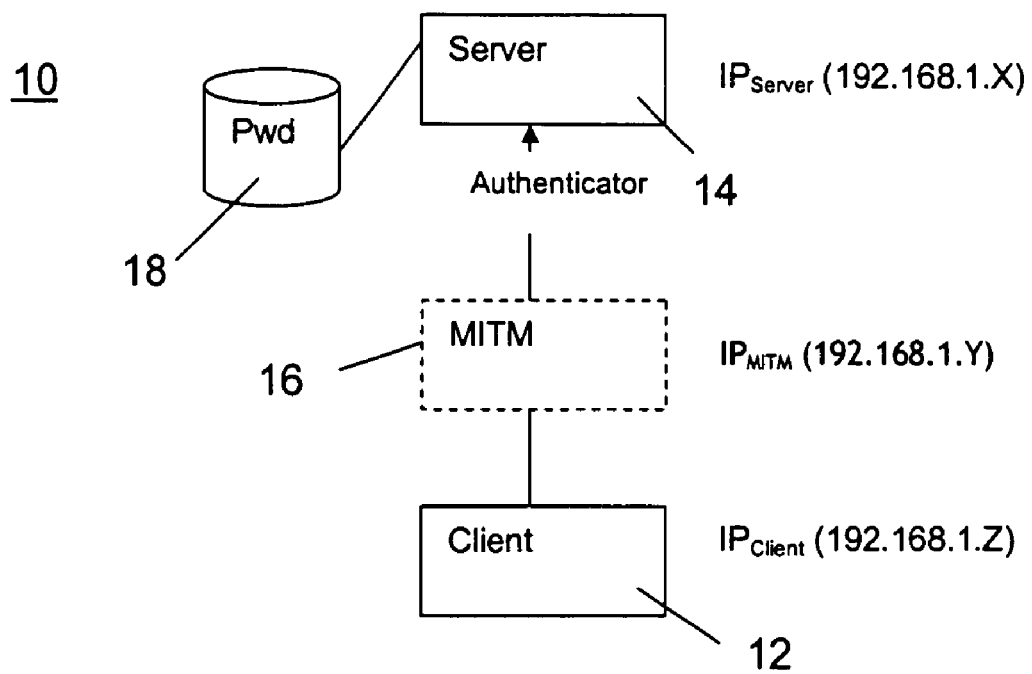
FIG. 5 is schematically illustrating the transmission of an authenticator in accordance with the present invention.

The computed hash value now the authenticator=Hash (pwd+$IP_{Client}$+$IP_{Server}$+nonce) is sent to the server 14 as depicted through FIG. 5. The server 14, has knowledge of the same parameters as the client 12, and makes an effort to reproduce the authenticator on its own in accordance with $Auth_{Server}$=Hash (pwd+$IP_{Client}$+$IP_{Server}$+nonce). This knowledge is gained from a memory for instance a password database (Pwd) 18 as depicted in FIG. 3-6, where the server stores passwords belonging to users or clients 12 that are permitted to access the server 14. The password retrieved from for instance a database 18 for passwords is the only parameter that the server 14 receives independently from the establishing of a communication between the client 12 and the server 14. Parameter $IP_{Client}$ and $IP_{Server}$ is obtained and known, respectively, by the server during the start up phase of a communication, and the nonce is communicated to the client 12, thus known by both the server 14 and the client 12.

Figure 6:
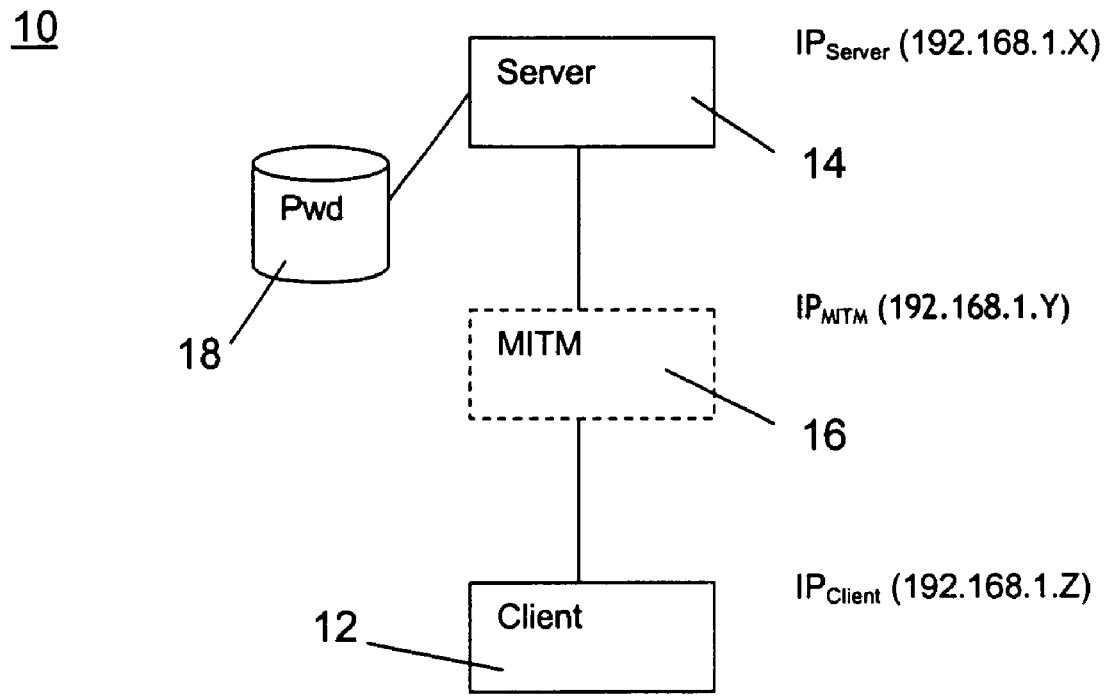
FIG. 6 is schematically illustrating how a client is connected after reproduction of the authenticator by a server in accordance with the communication depicted in FIG. 5.

If the authenticator supplied by the client 12 matches the one computed by the server 14, the user is authenticated as schematically indicated through the line in FIG. 6. If not, then the protocol for authentication is aborted and discarded.

Making the assumption that MITM 16 sits in the middle and tries to establish the communication with server 14 by replacing client 12, the server's version of $IP_{Client}$ will then be $IP_{MITM}$, thus producing a different hash value than the authenticator's. By the same token if the MITM 16 tries to take the role of the server 14, the client's version of $IP_{Server}$ will be $IP_{MITM}$. Since the hash algorithm is dependant on the exact order of how the parameters were concatenated, two very different hash values will be produced.

The client's authenticator would then be: Hash (pwd+$IP_{Client}$+$IP_{MITM}$+nonce) and the server would compute: Hash (pwd+$IP_{MITM}$+$IP_{Server}$+nonce). These hash values would obviously not match, and the MITM 16 is consequently denied access to the server 14.

Moreover, since MITM doesn't know the password, she will not be able to generate the authenticator by herself. Accordingly, the password should be hard to guess, preferably automatically generated, especially considering that people generally use passwords that are easy to remember and hence easy to guess. This knowledge forms the base for a detector of a MITM computer attack in accordance with the present invention, wherein the IP address of the man-in-the-middle computer is determined by reverse analyzing the transmitted authenticator by utilizing the reproduced correct authenticator.

If MITM 16 launches a MITM attack from the same host as either the server 14 or the client 12, the protocol will break. Generally, if MITM 16 has the power to manipulate the client computer 12 at will, launching a MITM attack is much harder than attacking the system by some other means, e.g. installing a keystroke logger. Protecting against an attack at an endpoint is extremely difficult, if not impossible.

In addition to the protocol described, the present invention provides an authenticator signal, preferably digital, utilized in the protocol for increasing safety against a man-in-the-middle computer access attack for point-to-point communication between client computer 12 and server 14, to services and/or applications and the like. The communication takes place in the medium of at least one of a network for data and telecommunication. Hereby, the signal comprises the hash value of at least the parameters clients password, client computer unique IP address (192.168.1.Z, fictitious), server IP address (192.168.1.X, fictitious), and the mentioned N byte nonce value, which constitutes the authenticator signal for accessing services provided by the server 14. As the authenticator signal comprises the client computer unique IP address, it prevents the authenticator signal from being sent from a MITM computer 16 with a different IP address (192.168.1.Y, fictitious).

There are pitfalls that should be avoided to ensure a secure implementation of the present invention. A cryptographically strong one-way hash algorithm should be used. There are mainly two algorithms available, MD5 and SHA-1 (SHA; Secure Hash Algorithm), which produce a 128-bit and a 160-bit hash value, respectively. Both algorithms are available in Java and known to a person skilled in the art.

MD5 is beginning to show cracks in its design, especially in its compression function. Furthermore, its hash value is considered to be more and more insecure against a brute-force attack (hurling of passwords until a system cracks) as computational power increases according to Moore's law, which stipulates that computing power doubles approximately every 18 months.

SHA-1 produces a larger hash value, which greatly increases its resistance against a brute-force attack. Furthermore, there are newer versions of this algorithm that allow for even larger hash values. The newer versions are named: SHA-256, SHA-384 and SHA-512. The number indicates how large a hash value is produced. As a result it is recommended that SHA-1, or one of its newer versions, should be used in the implementation of the present invention.

Since the password is the only secret component in the hash input, the design of a protocol utilized for the present invention would benefit from using a so-called HMAC (Hashed Message Authentication Code), which belongs to the set of crypto graphical HASH functions. HMAC functions have other features then conventional HASH functions, such as being collision resistant. One HMAC construction is described on http:/www.cs.ucsd.edu/users/mihir/papers/hmac.html. An HMAC is essentially a keyed hash algorithm. In the present invention, the key would be the hashed password. An HMAC can use any algorithm as the underlying hash function. Although it is recommended to use one of the hash algorithms mentioned above. Furthermore, there is a number of security issues associated with using a key as an input parameter to the hash function directly, whereas an HMAC is specifically designed for this purpose. In one embodiment of the present invention an HMAC is utilized with the hashed password as key to generate the authenticator.

The nonce value, for sake of precaution, should never be repeated for a given password, or the protocol could break. The nonce's only purpose is to guarantee the uniqueness of the resulting authenticator in order to thwart so called replay attacks. The easiest way to guarantee nonce uniqueness is to seed the pseudo-random number generator (PRNG) with password and some other volatile value, e.g. a timestamp or a counter. The generated nonce must never be repeated for a given password.

The size of the nonce is also quite important. If it is too small, the nonce value space will cause the nonce values to repeat, which will have a negative impact on the security of the protocol. Therefore, a minimum size of 16 bytes (128 bits) is recommended. This will yield a value space of $2^{128}$ unique values, assuming an even distribution. In reality, most pseudo-random number generators are not able to evenly distribute all the values, but this recommendation takes that into account by allowing a fairly large error margin; $2^{128}$ is a very large number. Generally, the larger the number space, the less probability of generating the same number twice.

The host addresses should be represented as IP addresses in favor of DNS host names. There is a number of security related issues regarding DNS services with a slew of different attacks that can be launched against it. IP addresses are more static and not susceptible to DNS-style attacks. On the other hand, IP addresses are not as secure as one might think; a skilled attacker can easily forge or manipulate IP packets at will. Still, it is generally better to use IP addresses instead of DNS names. Host addresses should be represented as IP addresses, not as DNS names. The current version of IP addresses is IPV4 and a new version will soon be introduced as IPV6, but the present invention is not limited to a specific version of these addresses.

Java offers two kinds of PRNGs, java.util.Random and java.security.SecureRandom. The former is of a type called a linear congruential generator and should preferably never be used in security-critical applications. Being provided enough mathematical skill, this number generator is trivial to break.

The latter PRNG (java.security.SecureRandom) is of much better quality and as a consequence, better suited for this type of application. Quality more often than not comes with a price and this is no exception. This PRNG is far slower than the other, especially in the first method invocation, when it initializes its internal state. Nevertheless, its advantages outweigh its disadvantages. The PRNG should be an instance of java.security.SecureRandom.

For security reasons, passwords should never be stored in the clear. They make a highly attractive target for attackers wishing to gain access to the system. The most common way to store the passwords is to store only its hashed values. Identical passwords share the same hash value. Thus, a password can be verified without compromising the actual password.

An attacker is then forced to generate hash values for a lot of different passwords and see if they match the stored hash values in order to crack a given password. An attacker would typically compile a large table of commonly used passwords and their associated hash value and start a hash value comparison routine. Whenever there is a match between the hash values, the attacker just has to lookup the corresponding password. This is commonly referred to as a dictionary attack.

Having passwords stored in the clear constitute a major risk to the overall security of a system. The present invention works equally well regardless if the passwords are hashed or not. Never store passwords in the clear. It is a good practice to use the recommended hash algorithms or like ones, regarding the safety aspect, to hash the passwords and store the hashes only.

In order to make a dictionary attack more difficult, a "salt" is commonly used. A salt value is simply a non-secret value that is concatenated to the password before it is hashed. This means that for each password an attacker must have as many hash values as there are possible salt values. Hence, if an n-bit salt value is used, the attacker must generate $2^n$ different hash values for each password. This raises the attacker's computational bar significantly. Thus, using a salt value of 32 bits (4 bytes) the attacker has to generate 4.294.967.296 ($2^{32}$) different hash values for each password in order to mount a dictionary attack.

However, while salt generally makes dictionary attacks more demanding, they provide little resistance against a dedicated attack on a single password since the salt value is not a secret. An attacker usually knows which password they would like to crack. Having said that, implementing "salted" hashes rarely affects the security negatively and it does provide additional diffusion to the hash value, making a dictionary attack very hard to launch. Hashed passwords should preferably be salted to protect against dictionary attacks.

Generally, people tend to choose bad passwords. Bad passwords are passwords that are easy to guess. There are mainly two ways of alleviating this problem, to force users to include special characters and numbers in their passwords or simply generate "difficult" passwords centrally and disallow users to set their own passwords.

Difficult passwords are hard to remember, so the latter approach will typically result in the user writing it down on a post-it note and stick it somewhere in the vicinity of the computer.

The present invention is preferably implemented in software to coexist with suitable hardware known to the skilled reader for point-to-point communication in a network for data and/or telecommunication.

It is thus believed that the operation of the present invention will be apparent from the present description. While it has been shown or described as being preferred it will be obvious for a person skilled in the art that various changes and modifications may be made without departing from the spirit and scope of the present invention as defined in the attached set of claims.

The invention claimed is:

1. An authentication protocol for increasing safety against a man-in-the-middle computer access attack for point-to-point communication, between a client computer and a server, to services in at least one of a network for data and telecommunication utilizing a challenge-response pattern, comprising:
  receiving from a client computer an authentication request containing a clients username to a server providing said services, said server identifying said client computer IP address and client password accessible by the server through the transmitted username;
  said server responding with an N byte nonce numerical value;
  receiving from said client computer a hash value of at least the parameters clients password, client computer unique IP address, server unique IP address, and said nonce value as an authenticator for accessing said services; and said server reproducing said authenticator by utilizing said hash algorithm and the parameters clients accessible password, client computer unique IP address, server unique IP address, and said nonce value, comparing the reproduction with the transmitted authenticator, and granting an access to said server and services if said reproduced authenticator matches said transmitted, thus by utilizing said client computer unique IP address and said server unique IP address in said authenticator preventing a man-in-the-middle computer, having a different IP address, from addressing said server with a matching authenticator.

2. The protocol according to claim 1, wherein said parameters are concatenated in an arbitrary order before said hash algorithm is applied.

3. The protocol according to claim 1, wherein said hash algorithm is one of SHA-1, SHA-256, SHA-384 and SHA-512.

4. The protocol according to claim 1, wherein said hash algorithm is an HMAC utilizing said password as a key.

5. The protocol according to claim 1, wherein a salt value is concatenated to said password before it is hashed.

6. The protocol according to claim 1, wherein said N byte nonce is a random data only generated once by a random generator and used once in said point-to-point communication and then discarded.

7. The protocol according to claim 6, wherein the random generator is provided with a seed to produce said nonce numerical value.

8. The protocol according to claim 7, wherein the seed is comprised of said password and a volatile value.

9. The protocol according to claim 8, wherein the volatile value is a timestamp value or a counter value.

* * * * *